W. G. PALMER.
FRUIT AND VEGETABLE GRADER.
APPLICATION FILED OCT. 23, 1914. RENEWED MAY 16, 1917.

1,251,093.  Patented Dec. 25, 1917.
3 SHEETS—SHEET 1.

WITNESSES:

INVENTOR
Walter G. Palmer.
BY
ATTORNEY

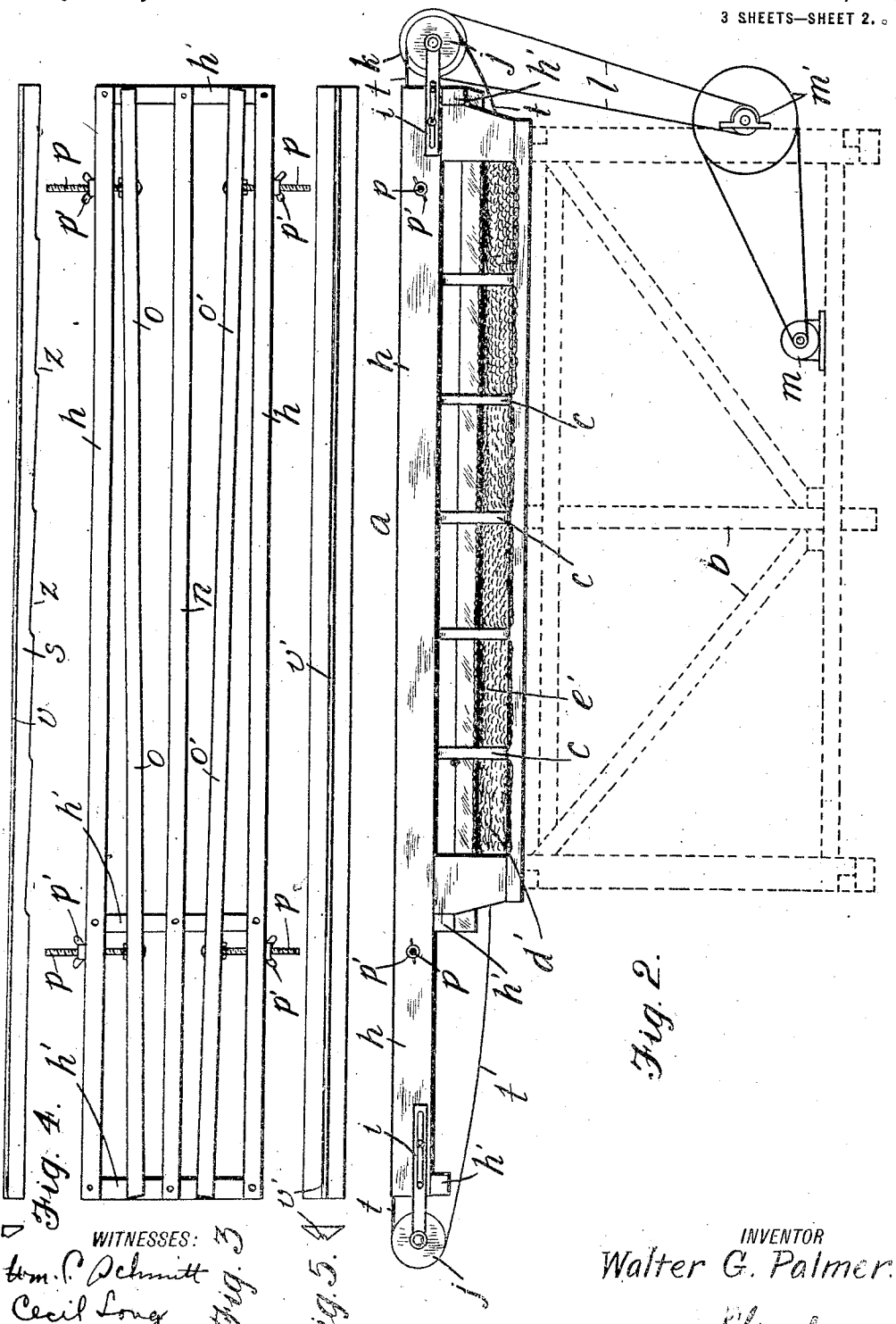

W. G. PALMER.
FRUIT AND VEGETABLE GRADER.
APPLICATION FILED OCT. 23, 1914. RENEWED MAY 16, 1917.
1,251,093.
Patented Dec. 25, 1917.
3 SHEETS—SHEET 3.
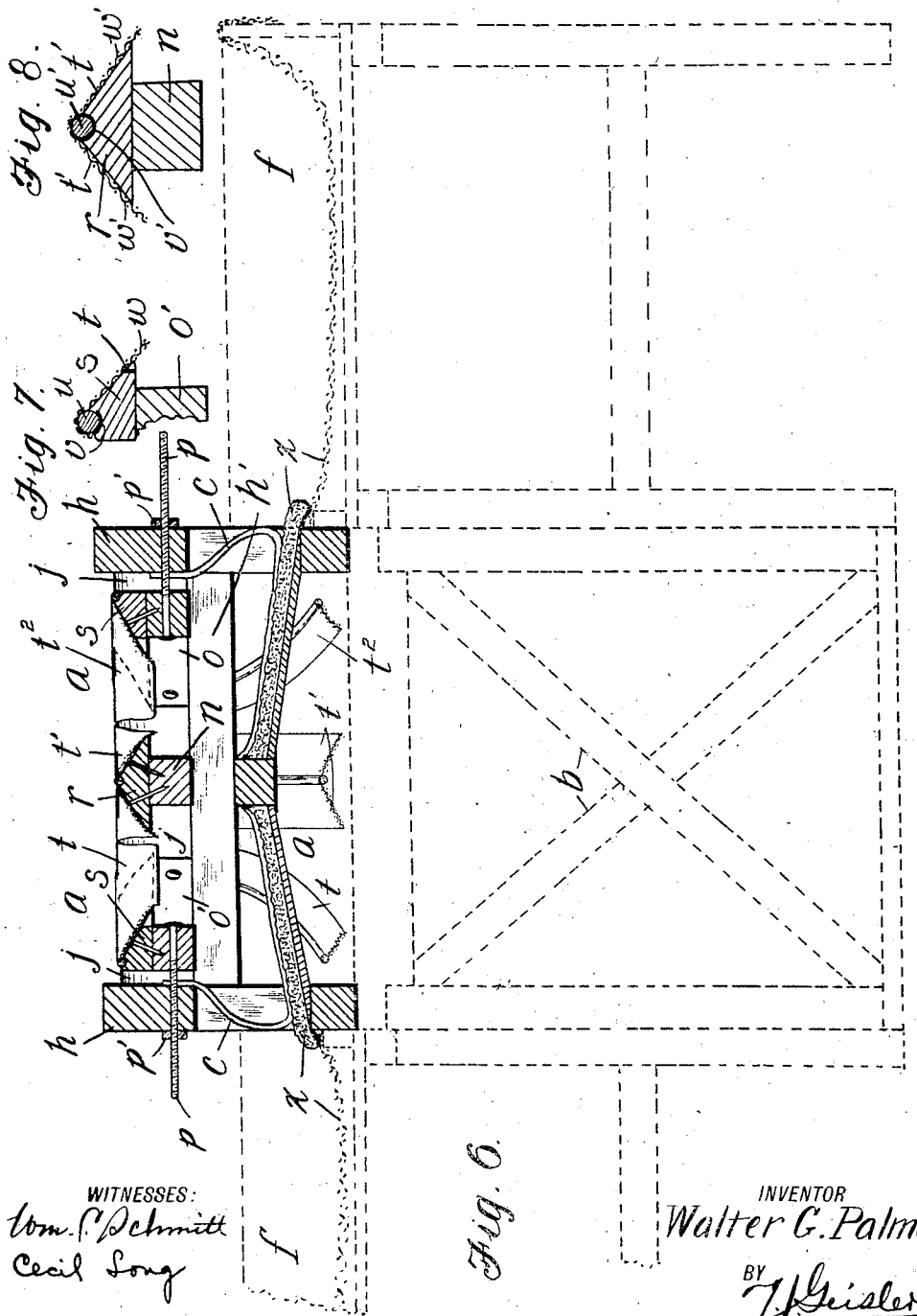
WITNESSES:
INVENTOR
Walter G. Palmer.
BY
ATTORNEY

UNITED STATES PATENT OFFICE.

WALTER G. PALMER, OF PORTLAND, OREGON.

FRUIT AND VEGETABLE GRADER.

1,251,093.  Specification of Letters Patent.  Patented Dec. 25, 1917.

Application filed October 23, 1914, Serial No. 868,835. Renewed May 16, 1917. Serial No. 169,121.

*To all whom it may concern:*

Be it known that I, WALTER G. PALMER, a citizen of the United States, and a resident of Portland, Multnomah county, State of Oregon, have invented a certain new and useful Improvement in Fruit and Vegetable Graders, of which the following is a specification.

The object of my invention is to provide a fruit and vegetable grader, especially suitable for apples for example, of simple construction, operating to automatically grade the fruit as to size, to perform this work rapidly, and to accomplish the grading without danger of bruising the fruit. My invention further has for its object to so arrange the grading means that they may be adjusted as desired. To this end my invention consists of a grading table having transverse partitions dividing the same into consecutive compartments, over which ways extend longitudinally and side by side, the ways having spaces between them increasing toward the discharge end of the grader; conveyer belts running lengthwise over the ways, means for driving the conveyer belts, and means for holding the conveyer belts in longitudinal alinement with said ways. The other features of my invention, and also the details of construction and operation of my grader are hereinafter fully described.

Fig. 2 is a side elevation of my grader;

Fig. 3 is a top view of the ways on which the conveyer belts are supported which carry the fruit through the grader;

Fig. 4 is a detail of construction of one of the ways illustrating that the inner edges of the ways may be provided with consecutive recesses for the purpose of making the spaces between the ways of uniform width between consecutive partitions of the grading table; to the left of this figure is also shown an end elevation of this way;

Fig. 5 is a detail showing a top view of the central way when my grader is constructed to have double capacity, which construction is that shown in the drawings; to the left of this figure is also shown an end elevation of this central way;

Fig. 6 is a cross section taken on the line 6—6 of Fig. 1, looking in the direction pointed by the arrow; and Figs. 7 and 8 are details of construction showing the particular form of conveyer belts which I find it convenient to use, and the particular means which I find it convenient to use for holding the conveyer belts in longitudinal alinement with the ways.

Figure 1:
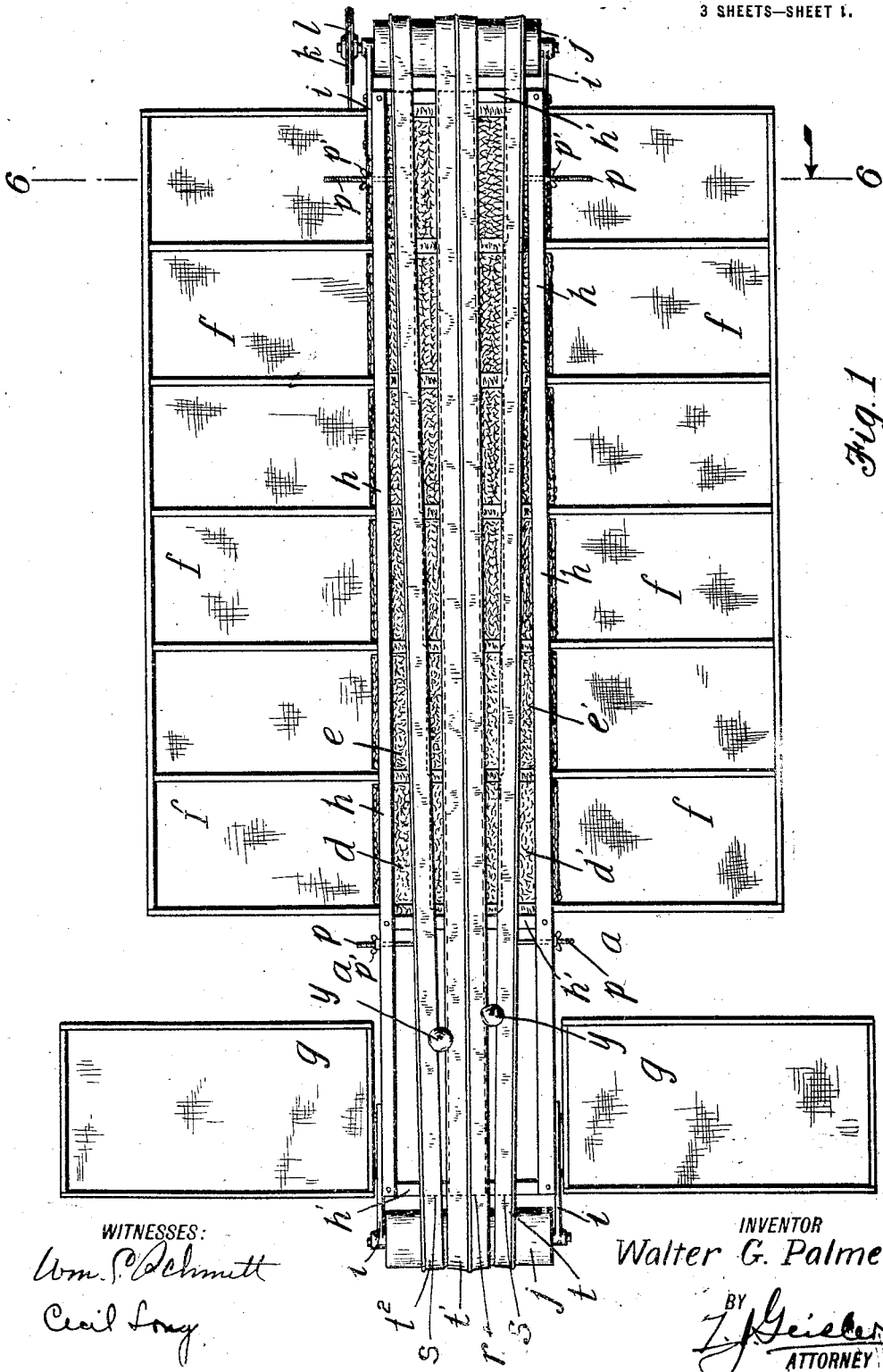
Figure 1 is a top view of my grader as commonly arranged in practice, also showing the tables arranged at the head ends thereof, and the tables arranged adjacent the consecutive compartments of my grader for receiving the graded fruit or vegetables.

The grading table, $a$, is mounted on a supporting frame $b$. The table is divided by transverse strap partitions, $c$, into a plurality of consecutive compartments $d$, $e$, $d'$, $e'$, each discharging into laterally disposed receiving bins $f$. At both sides of the head of the grader are provided bins $g$, in which the fruit or vegetable to be graded is deposited. On the table, $a$, are mounted longitudinal frame members $h$, $h$, to the extremities of which are fastened adjustable arms $i$, on the extremity of which are journaled rollers or belt carriers $j$. On the shaft of one of the belt carriers $j$ is mounted a groove pulley $k$, connected by a driving belt $l$ with a motor $m$, through the medium of the reducing gear $m'$, as shown in Fig. 2. The frame members $h$ are connected by transverse frame members $h'$, and midway between the frame members $h$ is fastened an immovable slat $n$, and on both sides of the latter are movable slats $o$, $o'$. As mentioned, my grader, as shown in the drawings, is designed for double capacity, and the central fixed slat $n$ coöperates with both the movable slats $o$, $o'$; the latter being adjustable independently at both their ends, so that the grader may be adjusted as required in the grading work to be done. In order to effect the adjustment of the movable slats $o$, $o'$, I use threaded bolts $p$, which hold said slats spaced from the frame members $h$. Wing nuts $p'$ allow the spacing to be readily adjusted. These adjusting bolts are provided at both sides of each movable slat. On the central fixed slat $n$ is mounted a way $r$, and on each of the movable slats $o$, $o'$ is mounted a way $s$. The opposed faces of the ways, $r$, $s$, have an inward decline, as illustrated by Figs. 5, 6, 7 and 8.

The fruit or vegetable to be graded is carried forward through the grader by conveyer belts $t$, $t'$, $t^2$, conveniently arranged as shown in Figs. 7 and 8. The conveyer belts $t$, $t^2$ consist of a rope-like belt $u$, to which is fastened one side of a strip of fabric $w$, and the conveyer belt $t'$, shown in Fig. 8, consists of a rope-like belt $u'$, centrally secured to a strip of fabric $w'$. In order to hold the conveyer in longitudinal alinement with the ways over which they travel, in other words, from having lateral movement on the faces of the ways $r$, $s$, I provide each of the latter with a longitudinal groove $v$, adapted for receiving the rope-like belts $u$, and provide the way $r$ with a groove $v'$ adapted for receiving the belt $u'$. For the same purpose I also provide the belt carriers or rollers $j$ with peripheral grooves adapted for receiving the rope-like belts $u$, $u'$.

The compartments in the grading table, as well as the bins $f$ on the sides thereof, are suitably upholstered as represented by $x$, to prevent the fruit from being bruised.

The operation of my grader is as illustrated in Fig. 1. Let $y$ represent pieces of the fruit. The inclined faces of the ways, $r$, $s$, will cause the fruit to roll between the ways on the conveyer belts until the space between the opposed edges of the conveyer belt is of sufficient size to permit the fruit to drop through. In order to expedite the grading operation, I find it convenient to make the space between the consecutive sections of the ways, extending between the partitions $c$ of the compartments of the grading table, of uniform width, so that the fruit, which is to be discharged into a compartment, will fall therein shortly after the fruit has been moved over the partition. I accomplish this result by providing the opposed edges of the ways with consecutive recesses, $z$, as illustrated in Fig. 4. Such arrangement causes the spaces between sections of the ways to be of uniform width, notwithstanding that the movable slats $o$, $o'$ and the ways thereon mounted, are arranged at an oblique angle with respect to the central way $r$ supported on the central fixed slot $n$.

I claim:

1. In a grader of the character described the combination of, a way having a sloping side and provided with a longitudinal groove in the apex, a belt traveling in such groove, and a lateral piece secured to said belt for which the sloping side of the way forms a support.

2. In a grader of the character described the combination of ways having convergent sloping sides, a longitudinal groove on the apexes of said ways, belts traveling in such grooves and having lateral pieces, said sloping sides forming supports for said lateral pieces.

3. In a grader of the character described, the combination of ways having convergent sloping sides, a longitudinal groove on the apexes of said ways, rope-like belts traveling in said grooves and fabric strips secured to such belts, said sloping sides forming supports for said fabric-strips.

4. In a grader of the character described, the combination of ways having convergent sloping sides, a longitudinal groove on the apexes of said ways, belts traveling in such grooves and having lateral pieces, said sloping sides forming supports for said lateral pieces, and means for adjusting said ways toward and from each other.

WALTER G. PALMER.

Witnesses:
WM. C. SCHMITT,
CECIL LONG.